(12) United States Patent
Kwak et al.

(10) Patent No.: US 11,905,346 B2
(45) Date of Patent: Feb. 20, 2024

(54) WASHING METHODS FOR ETHYLENE-ACRYLIC ACID COPOLYMER MANUFACTURING PROCESS USING SOLVENT

(71) Applicants: SK Innovation Co., Ltd., Seoul (KR); SK Geo Centric Co., Ltd., Seoul (KR)

(72) Inventors: Byoung Kyu Kwak, Daejeon (KR); Sun Joo Kim, Daejeon (KR); Hong Chan Kim, Daejeon (KR); Kyung Jin Ma, Daejeon (KR); Doh Yeon Park, Daejeon (KR); Jae Eun Lee, Daejeon (KR); Ho Seong Lee, Daejeon (KR); Juan Carlos Estevez Videira, Daejeon (KR); Manuel David Recasens Alvaro, Daejeon (KR); In Su Lee, Daejeon (KR); Wan Ju Jeong, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 131 days.

(21) Appl. No.: 17/484,015

(22) Filed: Sep. 24, 2021

(65) Prior Publication Data
US 2022/0098340 A1 Mar. 31, 2022

(30) Foreign Application Priority Data
Sep. 25, 2020 (KR) .................... 10-2020-0124337

(51) Int. Cl.
*C08F 2/01* (2006.01)
*C08F 2/06* (2006.01)
(Continued)

(52) U.S. Cl.
CPC .............. *C08F 210/02* (2013.01); *B01J 8/228* (2013.01); *B01J 19/0053* (2013.01); *B01J 19/06* (2013.01);
(Continued)

(58) Field of Classification Search
None
See application file for complete search history.

(56) References Cited

U.S. PATENT DOCUMENTS

2011/0184129 A1   7/2011   Mahling et al.
2015/0299357 A1  10/2015   Berbee et al.
(Continued)

FOREIGN PATENT DOCUMENTS

JP         S6220512 A      1/1987
KR      1020090019811 A    2/2009
(Continued)

*Primary Examiner* — Richard A Huhn
(74) *Attorney, Agent, or Firm* — The Webb Law Firm

(57) ABSTRACT

The present invention relates to a method for producing an ethylene-based copolymer, and more particularly, to a method for producing an ethylene-based copolymer capable of increasing process efficiency by preventing plugging and corrosion of a facility. The method for producing an ethylene-based copolymer includes a producing mode and a washing mode of which one is selectively performed. The producing mode includes: a) hyper-compressing primary compressed ethylene, and a mixture including a carboxylic acid-containing comonomer and a polar solvent to produce a compressed material; b) reacting the compressed material to produce a reaction product including an ethylene-based copolymer; and c) separating and recovering unreacted residues from the reaction product and introducing the unreacted residues into the mixture of step a). The washing mode includes: re-supplying the compressed material produced in step a) to step a) as a mixture, without performing step b).

7 Claims, 1 Drawing Sheet

(51) Int. Cl.
- *C08F 6/00* (2006.01)
- *C08F 6/10* (2006.01)
- *C08F 210/02* (2006.01)
- *C08F 220/04* (2006.01)
- *B01J 8/00* (2006.01)
- *B01J 19/00* (2006.01)
- *B01J 19/06* (2006.01)
- *B01J 19/24* (2006.01)
- *B01J 8/22* (2006.01)
- *B01J 20/30* (2006.01)
- *C08F 220/08* (2006.01)
- *C08F 6/06* (2006.01)

(52) U.S. Cl.
CPC ....... *B01J 19/2465* (2013.01); *B01J 20/3071* (2013.01); *C08F 2/01* (2013.01); *C08F 2/06* (2013.01); *C08F 6/005* (2013.01); *C08F 6/008* (2013.01); *C08F 6/06* (2013.01); *C08F 6/10* (2013.01); *C08F 220/04* (2013.01); *C08F 220/08* (2013.01); *B01J 2208/00761* (2013.01); *B01J 2219/00353* (2013.01); *B01J 2219/00389* (2013.01); *B01J 2219/00418* (2013.01); *C08F 2800/20* (2013.01)

(56) References Cited

U.S. PATENT DOCUMENTS

| | | |
|---|---|---|
| 2018/0134824 A1 | 5/2018 | Eddy et al. |
| 2018/0265611 A1* | 9/2018 | Berbee .................. C08F 2/001 |
| 2018/0305476 A1* | 10/2018 | Berbee .................. C08F 110/02 |
| 2020/0148800 A1 | 5/2020 | Rajesh Raja et al. |

FOREIGN PATENT DOCUMENTS

| | | |
|---|---|---|
| KR | 1020150099761 A | 9/2015 |
| KR | 1020200023648 A | 3/2020 |

* cited by examiner

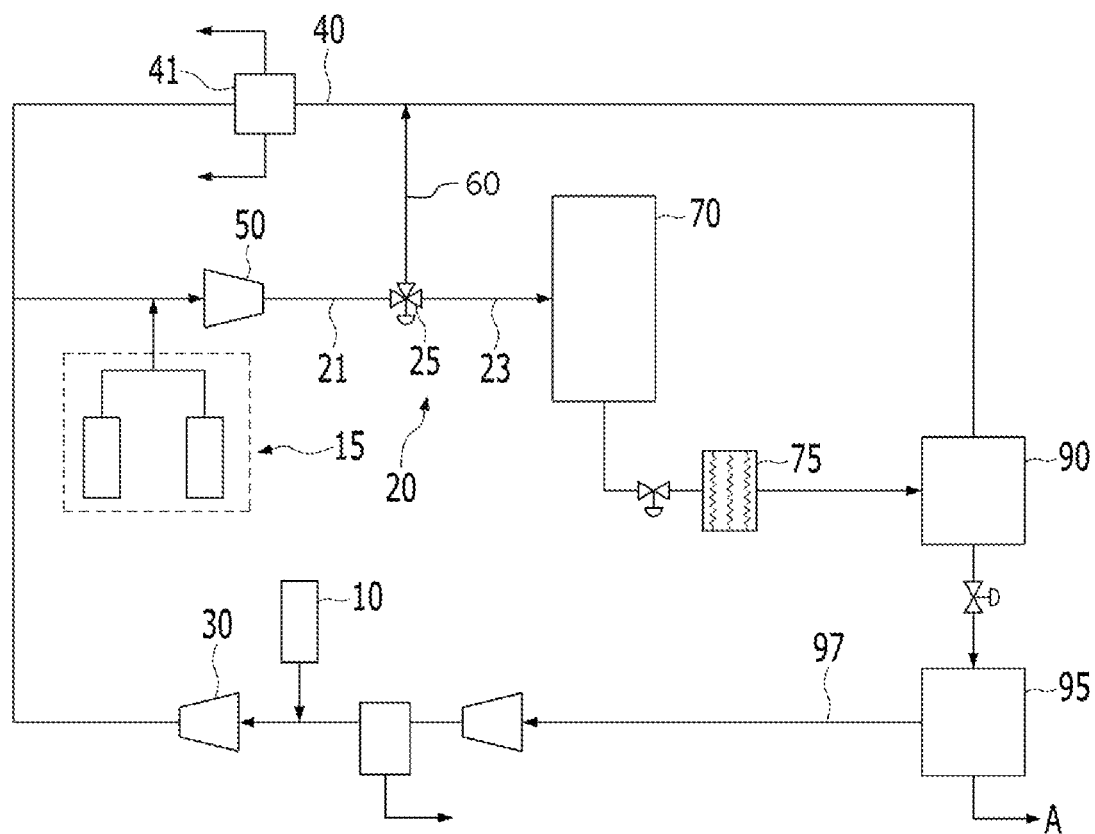

WASHING METHODS FOR ETHYLENE-ACRYLIC ACID COPOLYMER MANUFACTURING PROCESS USING SOLVENT

CROSS-REFERENCE TO RELATED APPLICATION

This application claims priority to Korean Patent Application No. 10-2020-0124337 filed Sep. 25, 2020 the disclosure of which is hereby incorporated by reference in its entirety.

BACKGROUND OF THE INVENTION

Field of the Invention

The following disclosure relates to a method for producing an ethylene-based copolymer, and more particularly, to a method for producing an ethylene-based copolymer capable of increasing process efficiency by removing and preventing plugging and corrosion of a facility.

Description of Related Art

Ethylene-based copolymers are generally produced by continuously introducing ethylene, one or more optional comonomers, and one or more organic peroxide initiators generally diluted in an organic solvent into an autoclave reactor or tubular reactor under a ultra-high pressure.

Conventionally, as disclosed in Korean Patent Laid-Open Publication No. 10-2009-0019811 entitled "Method for producing ethylene copolymer" and Korean Patent Laid-Open Publication No. 10-2020-0023648 entitled "High-pressure polymerization method for producing ethylene copolymer", a carboxylic acid-containing comonomer is used for production of the ethylene-based copolymer.

However, a conventional method for producing an ethylene-based copolymer causes various problems by using a comonomer having an acid group such as a carboxylic acid. First, there is a problem in that acidity of the carboxylic acid-containing comonomer causes a corrosion problem, such that a process facility maintenance cost is consumed. In addition, there is a problem in that plugging occurs in a process line due to high reactivity and self-polymerization of the carboxylic acid, and thus, a process should be frequently stopped and repair should be performed, such that process efficiency is deteriorated.

RELATED ART DOCUMENT

Patent Document (Patent Document 1) Korean Patent Laid-Open Publication No. 10-2009-0019811
(Patent Document 2) Korean Patent Laid-Open Publication No. 10-2020-0023648

SUMMARY OF THE INVENTION

An embodiment of the present invention is directed to providing a method for producing an ethylene-based copolymer capable of increasing process efficiency by preventing and removing corrosion and plugging of a production facility of an ethylene-based copolymer.

In one general aspect, there is provided a method for producing an ethylene-based copolymer, including a producing mode and a washing mode of which one selectively performed, wherein the producing mode includes: a) hypercompressing primarily compressed ethylene, and a mixture containing a carboxylic acid-containing comonomer and a polar solvent to produce a compressed material; b) reacting the compressed material to produce a reaction product including an ethylene-based copolymer; and c) separating and recovering unreacted residues from the reaction product and introducing the unreacted residues into the mixture of the step a), and wherein the washing mode includes: re-supplying the compressed material produced in the step a) to the step a) as a mixture, without performing the step b).

In the producing mode, the mixture of the step a) may contain 1 to 10 parts by weight of the comonomer and 1 to 10 parts by weight of the polar solvent based on 100 parts by weight of the primarily compressed ethylene.

In the washing mode, the mixture of the step a) may contain 1 to 20 parts by weight of the comonomer and 1 to 20 parts by weight of the polar solvent based on 100 parts by weight of the primarily compressed ethylene.

The polar solvent may include methyl alcohol, ethyl alcohol, isopropyl alcohol, methyl ethyl ketone, tetrahydrofuran, acetone, ethyl acetate, propyl acetate, butyl acetate, 2-methoxyethanol, and 2-ethoxyethanol.

The producing mode may further include: d) separating and recovering remaining unreacted residues from the reaction product from which the unreacted residues are separated in the step c), and introducing the remaining unreacted residues into the ethylene of the step a).

The washing mode may further include, before the re-supplying of the compressed material to the step a), separating impurities from the compressed material.

The method for producing an ethylene-based copolymer may further include a discharge mode for discharging the impurities, wherein one of the producing mode, the washing mode, and the discharging mode may be selectively performed.

In another general aspect, there is provided an apparatus for producing an ethylene polymer, the apparatus including: a primary compressor primarily compressing ethylene supplied from a first supply unit; a hyper compressor secondarily compressing a mixture containing a carboxylic acid-containing comonomer supplied from a second supply unit and a polar solvent, and the primarily compressed ethylene; a supply line supplying a compressed material compressed from the hyper compressor to a reactor; a high-pressure separator separating unreacted residues by primarily filtering a reaction product discharged from the reactor; a high-pressure circulation line supplying the separated unreacted residues from the high-pressure separator to a front end of the hyper compressor; a bypass line connecting a rear end of the hyper compressor to the high-pressure circulation line; and a control unit selectively transferring the compressed material to the supply line or the bypass line according to a producing mode and a washing mode.

The control unit may supply the compressed material to the reactor through the supply line in the producing mode, and transfer the compressed material to the high-pressure circulation line through the bypass line in the washing mode.

The bypass line may be branched from the supply line by a main valve, the supply line may include a first supply line to which the hyper compressor and the main valve are connected, and a second supply line to which the main valve 25 and the reactor are connected, and the control unit may supply the compressed material to the reactor by opening and closing the main valve so that the first and second supply lines are opened in the producing mode, and may transfer the compressed material to the high-pressure circulation line by opening and closing the main valve so that the first supply line and the bypass line are opened in the washing mode.

The apparatus for producing an ethylene-based polymer may further include a filter unit positioned at the rear end of the high-pressure circulation line and capable of filtering and removing impurities.

The apparatus for producing an ethylene-based polymer may further include a low-pressure separator secondarily filtering the discharge discharged from the high-pressure separator, and discharging a final product in which remaining unreacted residues are separated from the discharge; and a low-pressure circulation line supplying the separated unreacted residues from the low-pressure separator to a front end of the primary compressor.

BRIEF DESCRIPTION OF THE DRAWING

The FIGURE is a schematic view of an apparatus for producing an ethylene copolymer according to an exemplary embodiment of the present invention.

DESCRIPTION OF THE INVENTION

As used herein, technical terms and scientific terms have the general meaning understood by those skilled in the art to which the present invention pertains unless otherwise defined, and a description for the known function and configuration unnecessarily obscuring the gist of the present invention will be omitted in the following description and the accompanying drawings.

Further, singular forms used herein are intended to include the plural forms as well unless otherwise indicated in context.

In addition, units used herein are based on weight, unless otherwise specified. For example, the unit of % or ratio means % by weight or ratio by weight, and % by weight means % by weight of any one component in the total composition, unless otherwise defined.

In addition, numerical ranges used herein include a lower limit, an upper limit, and all values within that range, increments that are logically derived from the type and width of the defined range, all double-defined values, and all possible combinations of upper and lower limits of numerical ranges defined in different forms. Unless otherwise defined herein, values outside the numerical range that may arise due to experimental errors or rounded values are also included in the defined numerical range.

As used herein, the term "comprise" is an "open" description having the meaning equivalent to expressions such as "include," "contain," "have," or "feature", and does not exclude elements, materials, or process that are not further listed.

As used herein, the term "reaction product" is a product subjected to ethylene polymerization in the reactor in the process for producing an ethylene copolymer, and may include an ethylene copolymer and unreacted residues.

As used herein, the term "unreacted residue" refers to the remaining material other than the ethylene copolymer in the process for producing an ethylene copolymer, and may specifically include unreacted ethylene, carboxylic acid and polar solvents, and other additives, and initiators.

A method for producing an ethylene-based copolymer according to the present invention includes a producing mode and a washing mode of which one is selectively performed, wherein the producing mode includes: a) hyper-compressing primarily compressed ethylene, and a mixture containing a carboxylic acid-containing comonomer and a polar solvent to produce a compressed material; b) reacting the compressed material to produce a reaction product including an ethylene-based copolymer; and c) separating and recovering unreacted residues from the reaction product and introducing the unreacted residues into the mixture of the step a), and wherein the washing mode includes: re-supplying the compressed material produced in the step a) to the step a) as a mixture, without performing the step b).

Conventionally, a method for producing an ethylene-based copolymer causes various problems by using a comonomer having an acid group such as a carboxylic acid. First, there is a problem in that acidity of a carboxylic acid-containing comonomer causes a corrosion problem, such that a process facility maintenance cost is consumed. In addition, there is a problem in that plugging occurs in process lines and an apparatus due to a high reactivity and self-polymerization of a carboxylic acid-containing comonomer. Accordingly, in order to wash the facility, a process should be frequently stopped and repair should be performed, such that process efficiency is deteriorated. In particular, a hyper compressor requires a lot of time and cost in being restarted.

The method for producing an ethylene-based copolymer according to the present invention may prevent corrosion by a carboxylic acid-containing comonomer and self-polymerization of a carboxylic acid-containing comonomer while producing the ethylene-based copolymer, and prevent plugging, through a producing mode in which a mixture containing a carboxylic acid-containing comonomer and a polar solvent is selectively supplied, and a washing mode.

Specifically, the producing mode is a mode for producing an ethylene copolymer by reacting a mixture of a polar solvent having a washing function and a comonomer with ethylene, and may prevent the generation of plugging in the producing apparatus by preventing corrosion by the comonomer and self-polymerization of the comonomer during a producing process of the ethylene copolymer.

Also, the washing mode is a mode for washing the inside of the producing apparatus when plugging is generated in the producing apparatus, and is a mode in which the inside of the producing apparatus is washed by supplying and circulating ethylene and a mixture of a polar solvent and comonomer without reacting the ethylene with the mixture of the polar solvent and the comonomer. It is possible to increase lifespan of the process facility by washing the plugging through such a washing mode.

In an aspect of the present invention, a method of producing using an apparatus for producing an ethylene-based copolymer may be provided, the apparatus including: a supply unit that compresses primarily compressed ethylene through a primary compressor, and a mixture containing a carboxylic acid-containing comonomer and a polar solvent with a hyper compressor and supplies compressed materials to a reactor; a circulation unit that filter a reaction product discharged from the reactor, and supplies separated unreacted residues from the reaction product to a front end of the hyper compressor; and a bypass unit that connects the supply unit to the circulation unit, and transfers the compressed material compressed by the hyper compressor to the circulation unit. Here, the producing apparatus may be operated in a producing mode in which the compressed material compressed by the hyper compressor is supplied to the reactor through the supply unit; or a washing mode in which the compressed material compressed by the hyper compressor is supplied to the circulation unit through the bypass unit.

In detail, the producing mode may include: supplying primarily compressed ethylene through a primary compressor, and a mixture containing a carboxylic acid-containing comonomer and a polar solvent to a hyper compressor to form a compressed material; supplying the compressed material to a reactor through a supply unit to generate a reaction product; supplying the reaction product discharged from the reactor to a circulation unit, and supplying unreacted residues separated from the reaction product supplied to the circulation unit to a front end of the hyper compressor.

In such a producing mode, as the compressed material supplied to the reactor reacts in the reactor, an ethylene copolymer may be produced. In addition, ethylene and a comonomer may be supplied to the hyper compressor together with a polar solvent to prevent the generation of plugging of the hyper compressor even though the comonomer is present. In addition, as the compressed material (ethylene, comonomer, and polar solvent) compressed in the hyper compressor is supplied to the circulation unit through the reactor, and unreacted ethylene and the polar solvent are supplied again to the front end of the hyper compressor, it is possible to obtain the effect of preventing corrosion and suppressing the generation of plugging throughout the producing process by a polar solvent.

The washing mode may include: supplying the compressed material to the circulation unit through the bypass unit, and supplying the compressed material supplied to the circulation unit to the front end of the hyper compressor. In such a washing mode, the compressed material is transferred to the circulation unit through the bypass unit without passing through the reactor and supplied to a high-pressure separator. Accordingly, it is possible to remove the plugging without needing to stop and restart the high-pressure device (high-pressure separator), such that productivity and efficiency of the process may be increased. Further, the removal of the plugging may be performed using a process stop situation occurrence opportunity occur to prevent accumulation of foreign substances in the process, thereby preventing accidents due to the foreign substances.

In one aspect of the present invention, the producing mode may further include: d) separating and recovering remaining unreacted residues from the reaction product from which the unreacted residues were separated in the step c), and introducing the remaining unreacted residues into the ethylene of the step a).

Specifically, the apparatus for producing an ethylene-based copolymer described above may further include a low-pressure circulation unit for secondarily filtering the reaction product supplied to the circulation unit, discharging a final product in which remaining unreacted residues are separated from the reaction product, and supplying the separated remaining unreacted residues to a primary compressor, and the producing mode may be performed through such a producing apparatus. In this case, the producing mode may include: supplying the reaction product from which the unreacted residues are separated to a low-pressure circulation unit to separate the residual unreacted residue from the reaction product, and supplying the separated residual unreacted residue to a front end of the primary compressor.

The method for producing an ethylene copolymer further including such a producing mode may transfer the polar solvent up to the front end of the primary compressor that supplies ethylene, such that the polar solvent is transported throughout the producing apparatus, and the generation of plugging may be suppressed and various foreign substances remaining inside the producing apparatus may be removed.

In addition, in one aspect of the present invention, the apparatus for producing an ethylene-based copolymer described above may further include a filter unit installed in the circulation unit, and in this case, the washing mode may remove impurities from the compressed material through the filter unit. In such a washing mode, supplying the compressed material to the circulation unit through the bypass unit, and re-supplying the compressed material to the front end of the hyper compressor through the circulation unit as a unit process, if necessary, may be repeated two or more times. Accordingly, impurities in the compressed material may be easily removed without stop of the process, and the facility may be washed more clearly. When the washing mode is repeatedly performed, ethylene and the mixture may be freshly supplied to the front end of the hyper compressor as much as the amount of impurities removed to allow a certain amount of compressed material to circulate in the process.

In one aspect of the present invention, the method for producing an ethylene-based copolymer may further include a discharging mode for discharging the separated impurities in the washing mode, wherein one of the producing mode, the washing mode, and the discharging mode is selectively performed. In this case, in the discharging mode, impurities may be discharged to the outside through the filter unit installed in the high-pressure circulation unit. In the discharging mode, impurities removed from the inside of the process, i.e., plugging, may be finally discharged in the washing mode. In addition, in the producing mode, impurities other than unreacted ethanol and a polar solvent may also be removed from the unreacted residue supplied to the hyper compressor through the circulation unit.

In addition, when plugging occurs due to excessive impurities in the filter unit, an additional line may be installed to wash the inside of the filter unit by performing the discharging mode in the filter unit even in operating and non-operational states such as producing mode and washing mode.

In one aspect of the present invention, in the production mode, the mixture of step a) may contain 1 to 10 parts by weight of comonomer and 1 to 10 parts by weight of a polar solvent based on 100 parts by weight of ethylene, and specifically 3 to 7 parts by weight of comonomer and 3 to 7 parts by weight of a polar solvent based on 100 parts by weight of ethylene. In the production mode within the above range, the effect of preventing the generation of plugging may be obtained without lowering the production amount of ethylene, but the present invention is not limited thereto.

In one aspect of the present invention, in the washing mode, the mixture of step a) may contain 1 to 20 parts by weight of comonomer and 1 to 20 parts by weight of a polar solvent based on 100 parts by weight of ethylene, and specifically 3 to 10 parts by weight of comonomer and 3 to 10 parts by weight of a polar solvent based on 100 parts by weight of ethylene. In the washing mode within the above range, a plugging washing rate may be high, but the present invention is not limited thereto.

In each of the producing mode and the washing mode, the mixture of step a) may contain the same amount of ethylene, comonomer, and a polar solvent. In one embodiment, in the producing mode, the mixture of step a) may contain 90 wt % of ethylene, 5 wt % of comonomer, and 5 wt % of a polar solvent, and even in the washing mode, the mixture of step a) may contain 90 wt % of ethylene, 5 wt % of comonomer, and 5 wt % of a polar solvent.

Alternatively, in the washing mode, the amount of the polar solvent may be greater than in the producing mode in order to increase the plugging washing rate. In one specific example, in the producing mode, the mixture may contain 90 wt % of ethylene, 5 wt % of comonomer, and 5 wt % of a polar solvent, and in the washing mode, the mixture may contain 85 wt % of ethylene, 5 wt % of comonomer, and 10 wt % of a polar solvent.

The carboxylic acid may be, but is not limited to, any one or two or more monomers selected from acrylic acid, methacrylic acid, maleic anhydride, and maleic acid, and all comonomers used in the conventional production of the ethylene-based copolymer are applicable.

The polar solvent may be a low-boiling polar solvent, and specifically, one or two or more selected from the group consisting of methyl alcohol, ethyl alcohol, isopropyl alcohol, methyl ethyl ketone, tetrahydrofuran, acetone, ethyl acetate, propyl acetate, butyl acetate, 2-methoxyethanol, and 2-ethoxyethanol. Such a polar solvent may prevent corrosion by the carboxylic acid-containing comonomer and may exhibit an excellent plugging washing effect.

The producing mode, the washing mode, and the discharging mode may be selectively performed by a control unit. In one specific example, when a shaft position of a plunger portion of the hyper compressor is monitored in the producing mode and the shaft position of the plunger deviates from the reference set value by the plugging, the washing mode may be performed. Alternatively, the washing mode may be performed by detecting a change in temperature change due to friction generated in the plunger portion depending on a change in the axial position of the plunger portion.

Even when switching from the washing mode to the producing mode, it may be performed by sensing the shaft position and the change in temperature of the plunger.

The FIGURE illustrates a schematic view of an apparatus for producing an ethylene-based polymer according to an exemplary embodiment of the present invention.

Referring to the FIGURE, an apparatus for producing an ethylene polymer according to the present invention includes: a primary compressor 30 primarily compressing ethylene supplied from a first supply unit 10; a hyper compressor 50 secondarily compressing a mixture containing a polar solvent and a carboxylic acid-containing comonomer supplied from a second supply unit 15, and the primarily compressed ethylene; a supply line 20 supplying a compressed material compressed from the hyper compressor 50 to a reactor 70; a high-pressure separator 90 separating unreacted residues by primarily filtering a reaction product discharged from the reactor 70; a high-pressure circulation line 40 supplying the separated unreacted residues from the high-pressure separator 90 to the front end of the hyper compressor 50; a bypass line 60 connecting a rear end of the hyper compressor 50 to the high-pressure circulation line 40; and a control unit (not illustrated) selectively transferring the compressed material to the supply line 20 or the bypass line 60 according to a producing mode and a washing mode.

In the conventional apparatus for producing an ethylene-based polymer, when plugging occurs in the apparatus, the operation is stopped, and then the apparatus is washed and restarted. As a result, the time was excessively consumed due to a device requiring a long time to restart, such as the hyper compressor 50, and thus the process efficiency was significantly degraded.

The producing apparatus according to the present invention may selectively transfer the compressed material having a washing function to the supply line or the bypass line according to the producing mode and the washing mode, thereby efficiently removing the plugging generated inside the apparatus without stopping and restarting the high-pressure device (hyper compressor).

In the present invention, the primary compressor 30, the hyper compressor 50, the reactor (autoclave reactor) 70, the high-pressure separator (HPS) 90, and the low-pressure separator (LPS) have been conventionally used in the apparatus for producing an ethylene-based polymer, and a detailed description thereof will be omitted.

Specifically, the control unit supplies the compressed material to the reactor 70 through the supply line 20 in the producing mode, and transfers the compressed material to the high-pressure circulation line 40 through the bypass line 60 in the washing mode. Accordingly, in the producing mode, an ethylene polymer, which is the final product, may be produced by reacting the compressed product, and in the washing mode, the plugging may be removed without the need to stop and restart the high-pressure device (hyper compressor 50), thereby improving the productivity and efficiency of the process.

Specifically, the bypass line 60 connecting the rear end of the hyper compressor 50 to the high-pressure circulation line 40 may be branched from the supply line 20 by a main valve 25, and the supply line 20 connecting the hyper compressor 50 to the reactor 70 to supply the compressed material compressed from the hyper compressor 50 to the reactor 70 may include a first supply line 21 to which the hyper compressor 50 and the main valve 25 are connected, and a second supply line 23 to which the main valve 25 and the reactor 70 are connected. Here, the control unit may supply the compressed material to the reactor 70 by opening and closing the main valve 25 so that the first and second supply lines 21 and 23 are opened in the producing mode, and may open the main valve 25 so that the first supply line 21 and the bypass line 60 are opened to transfer the compressed material to the circulation line in the washing mode. Such a control unit allows a process manager to easily selectively perform a producing mode and a washing mode only by opening and closing the main valve 25.

In one aspect of the present invention, the apparatus for producing an ethylene-based polymer may further include a filter unit 41 positioned at the rear end of the high-pressure circulation line 40 and capable of filtering and removing impurities. The filter unit 41 may remove impurities other than unreacted ethanol and a polar solvent from the unreacted residues supplied to the hyper compressor 50 through the high-pressure circulation line 40 in the producing mode, and may filter the plugging transferred through the circulation line in the washing mode so as to be discharged to the outside of the device, thereby maintaining the inside of the device in a clean state.

In one aspect of the present invention, the apparatus for producing an ethylene-based polymer may further include a low-pressure separator 95 for secondarily filtering the reaction product discharged from the high-pressure separator 90, that is, a reaction product from which unreacted residues are separated by performing primary filtering, and discharging a final product (A) from which remaining unreacted residues are separated from the reaction product; and a low-pressure circulation line 97 for supplying the unreacted residues separated from the low-pressure separator 95 to the front end of the primary compressor 30. Such a low-pressure separator and low-pressure circulation line enables the production of high-purity ethylene polymer by re-removing unreacted residues, and enables washing the plugging throughout the device as the unreacted residue containing ethylene and a polar solvent is supplied to the primary compressor 30.

Thus, it is possible to have high process efficiency in the production of an ethylene-based polymer through such a producing apparatus.

[Example 1]—Producing Mode

Ethylene (DOW) subjected to primary compression in a primary compressor at a temperature of 30° C. and a pressure of 200 bar was supplied to a secondary compressor at an average flow rate of 3 m³/min, and a mixture of acrylic acid (Arkema) and ethyl acetate (Quimidrosa) in a weight ratio of 7:1 was supplied to the secondary compressor at an average flow rate of 0.004 m³/min. Thereafter, a second pressure was applied at a temperature of 20° C. and a pressure of 200 bar. Here, a main valve was opened so that the first and second supply lines were opened by a control unit. The compressed material and initiators (tert-butyl peroxyacetate, tert-butyl peroxy-2-ethylhexanoate) were supplied to a reactor at an average flow rate of 0.4 m³/min. Then, the reaction was carried out at a reaction temperature of 250° C. and a pressure of 2,250 bar in the reactor. Next, the reaction product discharged from the reactor was supplied to a high-pressure separator at an average flow rate of 1.3 m³/min. The unreacted residues separated by the high-pressure separator were supplied to the secondary compressor at an average flow rate of 1.4 m³/min through a circulation line, and the reaction product from which the unreacted residues are primarily removed by the high-pressure separator was supplied to a low-pressure separator to secondarily remove unreacted residues. The unreacted residues removed from the low-pressure separator were re-supplied to the primary compressor at an average flow rate of 5.0 m³/min, and 2,500 kg/hr of the final product from which the unreacted residues were removed in the low pressure separator was produced.

[Example 2]—Washing Mode

In the producing mode of Example 1, a temperature of a plunger portion of a hyper compressor was detected as 80° C. or more, and the washing mode was performed.

Ethylene (DOW) subjected to primary compression in a primary compressor at a temperature of 30° C. and a pressure of 200 bar was supplied to a secondary compressor at an average flow rate of 0.1 m³/min. Then, a mixture of acrylic acid (Arkema) and ethyl acetate in a weight ratio of 7:1 was supplied to the secondary compressor at an average flow rate of 0.01 m³/min. Thereafter, a second pressure was applied at a temperature of 20° C. and a pressure of 200 bar. Here, a main valve was opened by a control unit so that a first supply line and a bypass line were opened (a second supply line was closed). The compressed material was supplied to the circulation line at an average flow rate of 0.8 m³/min and supplied to the secondary compressor. Such a washing mode was performed for about 12 hours.

Comparative Example 1

Comparative Example 2 was carried out in the same manner as that in Example 1, except that ethyl acetate was used as a polar solvent.

During the processes according to Examples 1 and 2 and Comparative Example, efficiency of an installed heat exchanger and compression efficiency of the hyper compressor were evaluated to determine whether the plugging was removed. The results are shown in Table 1 below. It can be confirmed from Table 1 that the efficiency of the heat exchanger and the hyper compressor of the present invention was excellent. That is, it can be confirmed that the generation of plugging was suppressed throughout the process.

TABLE 1

| | Unit | Comparative Example 1 | Example 1 |
|---|---|---|---|
| Heat exchanger at a rear end of reactor (reference number 75) Δ T (Process in-Process out) | ° C. | 47 | 60 |
| Filter unit (reference number 41) Δ T (Process in-Process out) | ° C. | 15 | 20 |
| Hyper compressor (reference number 50) Discharge Pressure | barg | 2,307 | 2,348 |

The method for producing an ethylene-based copolymer according to the present invention may prevent corrosion by carboxylic acid and a polar solvent, and may prevent plugging due to self polymerization, through a production mode and a washing mode supplying a mixture containing a carboxylic acid-containing comonomer and a polar solvent.

In addition, the plugging generated in the process for producing an ethylene-based copolymer through the washing mode may be washed, such that the life of the process facility may be increased, and the plugging may be removed without needing to stop and restart a high-pressure device, such that the productivity and efficiency of the process may be increased.

Hereinabove, although the present invention has been described by specific matters, the limited embodiments and drawings, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. A method for producing an ethylene-based copolymer, comprising a producing mode and a washing mode,
   wherein the producing mode includes the steps of:
   a) hyper-compressing primarily compressed ethylene, a mixture containing a carboxylic acid-containing comonomer and a polar solvent to produce a compressed material;
   b) reacting the compressed material to produce a reaction product including an ethylene-based copolymer; and
   c) separating and recovering unreacted residues from the reaction product and introducing the unreacted residue into the mixture of step a), and
   wherein the washing mode includes the step of: re-supplying the compressed material produced in step a) to step a) as a mixture, without performing step b).

2. The method of claim 1, wherein in the producing mode, the mixture of step a) contains 1 to 10 parts by weight of the comonomer and 1 to 10 parts by weight of the polar solvent based on 100 parts by weight of the primarily compressed ethylene.

3. The method of claim 1, wherein in the washing mode, the mixture of step a) contains 1 to 20 parts by weight of the comonomer and 1 to 20 parts by weight of the polar solvent based on 100 parts by weight of the primarily compressed ethylene.

4. The method of claim 1, wherein the polar solvent includes methyl alcohol, ethyl alcohol, isopropyl alcohol, methyl ethyl ketone, tetrahydrofuran, acetone, ethyl acetate, propyl acetate, butyl acetate, 2-methoxyethanol, and 2-ethoxyethanol.

5. The method of claim 1, wherein the producing mode further includes: d) separating and recovering remaining unreacted residues from the reaction product from which the unreacted residues are separated in step c), and introducing the remaining unreacted residues into the ethylene of step a).

6. The method of claim 1, wherein the washing mode further includes, before the re-supplying of the compressed material to step a), separating impurities from the compressed material.

7. The method of claim 1, further comprising a discharging mode for discharging the impurities.

* * * * *